(No Model.)
J. S. CRUM.
LISTING PLOW.
No. 355,978.  Patented Jan. 11, 1887.
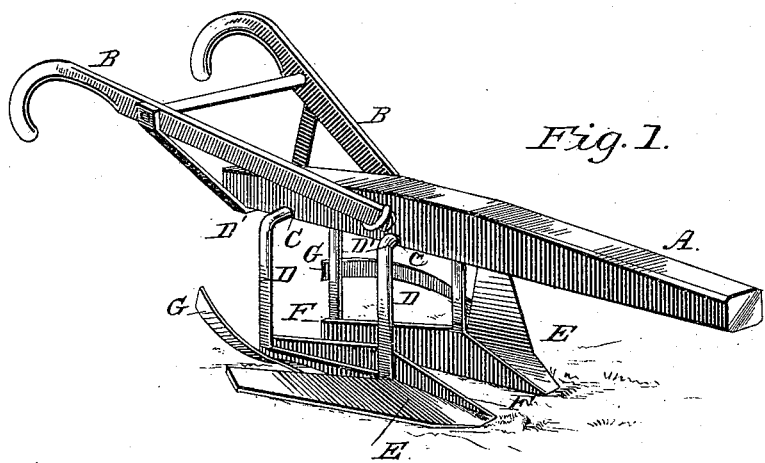
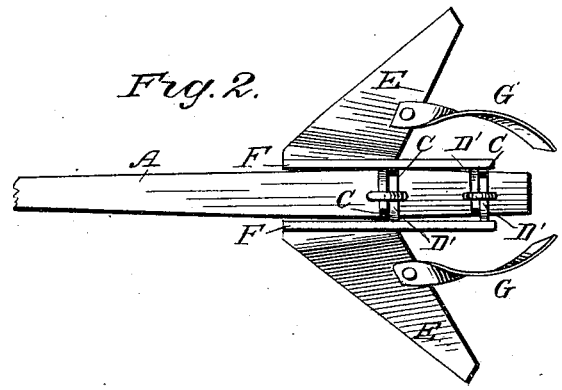
WITNESSES:
Fred G. Dieterich
Solon C. Kemon
INVENTOR:
J. S. Crum
BY Munn & Co.
ATTORNEYS.

UNITED STATES PATENT OFFICE.

JOSEPH S. CRUM, OF MANHATTAN, KANSAS.

LISTING-PLOW.

SPECIFICATION forming part of Letters Patent No. 355,978, dated January 11, 1887.

Application filed October 18, 1886. Serial No. 216,575. (No model.)

*To all whom it may concern:*

Be it known that I, JOSEPH S. CRUM, of Manhattan, in the county of Riley and State of Kansas, have invented a new and useful Improvement in Listing-Plows, of which the following is a specification.

My invention consists in a new and useful plow for cultivating listed corn, which will be hereinafter fully described and claimed.
Referring to the accompanying drawings, Figure 1 is a perspective view of my improved plow complete. Fig. 2 is a plan view of the plow beam and shares.

The same letters of reference indicate corresponding parts in both the figures.
Listed corn being planted in deep furrows, it is found very difficult with the plows now in use to cultivate it; and to overcome this difficulty by the production of a plow which will easily and perfectly cultivate listed corn is the object of my invention.

Referring to the several parts by letters, A represents the beam of my listing-plow, to which are secured the handles B, of ordinary construction. The lower side of the beam toward its rear end is formed with the two transverse grooves C C, or suitable transverse sockets may be secured in or on the lower side of the beam to answer the same purpose. In these grooves are adjustably secured the upper inwardly-bent ends, D' D', of the uprights or standards D D, the standards on each side of the beam being parallel to the two on the other side of the beam. To the lower ends of each pair of standards D is secured a plow blade or share, E, the forward portion of the cutting-edge of which lies in a horizontal plane, while the larger rear outwardly-extending portion of each blade is bent or inclined upward, as shown, the object and advantage of this construction being that the blades cut or cultivate both the bottom and sides of the deep furrow in which the listed corn is planted.

To the inner sides of the lower ends of the standards are secured the guards or fenders F, which consist of strips or plates secured in vertical horizontal planes to the lower ends of the standards, parallel to each other. These guards keep the dirt, stones, &c., from rolling on the corn when young and small.

G G indicate auxiliary blades curved inwardly at their rear free ends and removably secured at their forward ends to the under side of the main blades E. These auxiliary blades are removed from the plow for the first plowing, but are secured in position as the corn becomes larger for the subsequent plowings, and then operate to throw more earth to the corn.

It will be seen that as the pairs of standards are adjustably secured at their upper ends to the plow-beam, they may be adjusted to regulate as desired the space between the blades and guards carried by their lower ends.

By making the forward ends of the plow-blades narrow, with their rear portions extending upward and outward, as shown, it will be seen that the blades will fit well down within the furrow, and by constructing the entire plow in the manner described the listed corn is thoroughly and effectively cultivated, with no more difficulty or labor than is experienced in cultivating corn which is not listed.

From the foregoing description, taken in connection with the accompanying drawings, the construction, operation, and advantages of my invention will be readily understood.

It will be seen that my listing-plow is simple and strong in construction and exceedingly effective in operation.

Having thus described my invention, what I claim, and desire to secure by Letters Patent, is—

1. An improved plowshare, E, having the forward portion of its cutting-edge reduced and horizontal, and provided with an upwardly-inclined and outwardly-extending rear portion, substantially as shown and described, whereby provision is made for cultivating both the bottom and sides of the furrow, as set forth.

2. The plowshare E, having the reduced horizontal forward end, and provided with the upwardly-inclined and outwardly-extending rear portion, and with the guards or fenders F, substantially as herein shown and described.

3. The combination, with the beam, of the adjustable standards, the guards, and the blades having the reduced horizontal forward ends and the upwardly-inclined outwardly-extending rear portions.

4. The combination, with the beam, of the adjustable standards, the guards, the removable auxiliary blades, and the blades having the reduced horizontal forward ends and the upwardly-inclined outwardly-extending rear portions, all constructed and arranged to operate substantially in the manner and for the purpose herein set forth.

JOSEPH S. CRUM.

Witnesses:
JOHN S. HOHMAN,
R. J. HARPER.